United States Patent [19]

Stöver et al.

[11] Patent Number: 4,498,884
[45] Date of Patent: Feb. 12, 1985

[54] METHOD OF MANUFACTURING A DISPLAY TUBE

[75] Inventors: Johannes H. Stöver; Johannes A. Van Leeuwen, both of Eindhoven, Netherlands

[73] Assignee: U.S. Philips Corporation, New York, N.Y.

[21] Appl. No.: 347,765

[22] Filed: Feb. 11, 1982

[30] Foreign Application Priority Data

Mar. 16, 1981 [NL] Netherlands ......................... 8101263

[51] Int. Cl.³ .............................................. F23M 9/04
[52] U.S. Cl. .......................................... 445/45; 445/8
[58] Field of Search ................... 445/8, 22, 45; 65/41, 65/104, 115, 117; 432/10, 65, 226, 249, 245

[56] References Cited

U.S. PATENT DOCUMENTS

| | | | |
|---|---|---|---|
| 2,956,373 | 10/1960 | Earhart | 65/115 |
| 2,991,591 | 7/1961 | Gabor et al. | 65/115 |
| 3,250,605 | 5/1966 | Matsumoto et al. | 65/117 |
| 3,879,167 | 4/1975 | DeLuca et al. | 432/10 |
| 3,894,858 | 7/1975 | Rogers | 65/41 |

*Primary Examiner*—Kenneth J. Ramsey
*Assistant Examiner*—Kurt Rowan
*Attorney, Agent, or Firm*—Robert J. Kraus

[57] ABSTRACT

When affixing the display screen to the cone and upon evacuating the display tube, the display screen and the cone are subjected to temperature treatments in which stresses occur in the display screen which might cause fracture of the display tube. In order to reduce the probability of fracture, during the temperature treatment measures are taken which infuence the temperature distribution over the display screen and the cone in such manner that the occurrence of stresses in the display screen is counteracted.

8 Claims, 9 Drawing Figures

METHOD OF MANUFACTURING A DISPLAY TUBE

BACKGROUND OF THE INVENTION

The invention relates to a method of manufacturing a display tube comprising a display screen having an upright edge and a cone, in which the display screen and the cone are subjected to temperature treatments during which measures are taken to reduce stresses occurring in the display screen.

A display tube is usually composed of a display screen and a cone which are affixed to each other by means of a glass frit provided on the edge of the cone. In a so-called adhering jig the display screen is accurately positioned on the cone. The cone and the display screen are then passed through a furnace in which the glass frit recrystallizes during heating at a fixed temperature range so that the display screen and the cone are joined rigidly and in a vacuum-tight manner.

After placing the electron gun in the neck of the display tube, the display tube is evacuated while heating. During pumping, the display tube is passed through a furnace in which the display tube is degassed while it is heated at a fixed temperature range. During the cooling process the tube is sealed in a vacuum-tight manner.

A method of the kind mentioned in the opening paragraph is disclosed in U.S. Pat. No. 4,152,036. During the temperature treatments in manufacturing the display tube, stresses occur in the display screen. Upon vacuum pumping the display tube to which the above Patent relates in particular, these stresses are caused by the temperature difference and by the pressure differential between the outside and the inside of the display tube. These stresses may cause fracture of the display tube. In order to counteract the stresses a mechanical pressure is exerted on parts of the periphery, in particular the corners of the display screen. For that purpose, a display tube is placed in a jig which has four arms which are secured approximately in their centres to the jig so as to be rotatable. At one end the arms are connected to a ring and at their other end they engage the corners of the display screen. When the ring expands the arms pivot about midpoints so that the ends exert a pressure on the corners of the display screen which is proportional to the temperature of the display tube.

However, the jig is of a complicated construction which is not well suited for use in mass production. Moreover, the jig is not suitable for use in affixing the display screen to the cone.

For a better understanding, the occurrence of stresses in the display screen during the various temperature treatments will now be described in greater detail.

When affixing the display screen to the cone a temperature difference occurs between the outside and the inside of the tube, which results in tensile stresses in the tube. As a result of the temperature difference between the inside and the outside, the display screen will dome so that the upright edge of the display screen is drawn inwardly. Due to greater rigidity, the corners of the display screen are drawn inwardly to a comparatively smaller extent than the centres of the sides of the upright edge of the display screen. This causes tensile stresses in the corners of the display screen which are added to the tensile stresses which are caused by the temperature difference between the outside and the inside of a corner of the display screen.

It has also been found that in colour display tubes in which a colour selection electrode is suspended from suspension means connected in the corners of the display screen, said suspension means cause additional tensile stresses in the corners of the display screen. These additional tensile stresses in such display tubes result in a larger percentage of fracture than in display tubes in which the colour selection electrode, as is usual nowadays, is suspended from suspension means connected in the centres of the sides of the upright edge of the display screen.

Upon vacuum pumping the display tube, the above tensile stresses also occur. These tensile stresses are larger than those occurring when affixing the display screen because the warm-up speed is faster. These larger tensile stresses are partly compensated for by the compressive stresses occurring as a result of the vacuum pumping, which stresses are directed opposite to the tensile stresses.

The tensile stresses occurring when affixing the screen and vacuum pumping the display tube cause a percentage of fractures resulting in considerable losses, in particular in colour display tubes in which the colour selection electrode is suspended in the corners of the display screen.

SUMMARY OF THE INVENTION

It is therefore an object of the invention to provide a method of manufacturing a display tube with which fracture of the display tube during screen affixment and pumping of the display tube is substantially avoided in a simple manner.

In accordance with the invention, fracture is avoided by influencing the temperature distribution over the display screen and the cone during the warm-up part of the temperature treatments. The invention is based on the recognition of the fact that it is possible to reduce the occurrence of stresses in the display screen considerably by locally varying the temperature of the display tube. As a result of the reduced stresses the probability of fracture is considerably reduced.

In a first embodiment a heat shield is providing on or at some distance from the central part of the display screen. Because of the heat shield, the central part of the display screen upon traversing the temperature range is heated at a slower rate than the remaining parts of the display tube. During the warm-up of the display tube, heated air is guided from the neck past the display tube. By providing a heat shield at some distance from the display screen, les air turbulence occurs at the central part of the display screen and the central part is warmed up less rapidly. Alternatively, a heat shield of a poorly heat conducting material may be placed on the central part of the display screen so that the central part of the display screen is warmed up less rapidly. By providing a heat shield on or at some distance from the display screen, a smaller temperature difference occurs between the outside and the inside of the display screen. Because this the extent of doming of the display screen will be smaller and the tensile stresses in the corners of the display screen are reduced. As a result of this the probability of fracture is also reduced. The heat shield may be used both when affixing the display screen to the cone and when evacuating the display tube. The heat shield may comprise a pattern of apertures. This pattern is preferably such that the transmission of the heat shield increases proceeding from the centre towards the edge of the heat shield. As a result of the pattern of apertures a uniform temperature distribution occurs over the display screen.

In a second embodiment the display screen is heated by means of thermal radiation. By using thermal radiation instead of heated air, a smaller temperature gradient occurs over the display screen. Because of this the extent of doming of the display screen will be smaller and the tensile stresses in the corners of the display screen will be reduced, as a result of which the probability of fracture is also reduced. Heating of the display screen with thermal radiation may be used both during affixment of the display screen to the cone and during evacuation of the display tube.

A third embodiment includes preheating at least the display screen prior to the temperature treatments. After preheating, the outside of the display screen will cool down faster than the inside of the display screen, so that upon insertion into the furnace for affixing the display screen to the cone and for evacuating the display tube, the inside of the display screen will have a higher temperature than the outside of the display screen. Because of this a temperature gradient occurs over the display screen which is opposite to the temperature gradient which occurs as a result of heating the display tube in the furnace. The resulting temperature difference between the outside and the inside of the display screen is thus considerably reduced. Because of this the extent of doming of the display screen will be smaller and the tensile stresses in the corners of the display screen are reduced. Preheating the display screen for affixment may be done, for example, by means of a number of infra-red lamps. The preheating for evacuating the display tube can advantageously be achieved by evacuating the display tube immediately after affixing the display screen to the cone, while the tube is still warm.

In a fourth embodiment, the display screen and the cone are subjected to a temperature treatment, during evacuation of the display tube, which includes warming up at least the corners of the cone at a slower rate than the remaining parts of the display tube. As a result of the lower temperature of the corners of the cone a compressive stress occurs in the corners upon warming up during evacuation the tube, which stress is opposite to the tensile stress caused by the doming of the display screen. Because of this the resulting tensile stress in the corners of the display screen is considerably reduced and the probability of fracture of the display tube is correspondingly reduced.

In another embodiment, heat shields are provided at a small distance from the corners of the cone. The heat shields engage the cone along their circumferences. The heat shields shield the corners of the cone from the warm air which is passed along the tube. Because the edges of the heat shields engage the cone, a chimney effect is prevented from occurring between the heat shields and the cone, thus preventing the corners of the cone from being warmed up more rapidly. In order to obtain a uniform temperature variation in the corners, the heat shields may comprise a pattern of apertures with or without different heat transmission capabilities.

Another method includes heating the upright edge of the display screen to a higher temperature than the remaining parts of the display screen by means of extra heating elements. Because of the higher temperature of the upright edge of the display screen, the upright edge will expand to a greater extent and the doming of the display screen is counteracted.

In another method in accordance with the invention, the display screen and the cone are subjected to a temperature treatment when affixing the display screen to the cone, during which temperature treatment a glass frit provided between the display screen and the cone recrystallizes and during which temperature treatment the cone is kept at a higher temperature than the display screen. Because of the higher temperature, the expansion of the cone will be larger than that of the display screen. In this condition the display screen and the cone after recrystallization of the glass frit are joined together. As a result of this, after cooling, a pre-stress occurs in the display screen which largely compensates for the tensile stress developed during evacuation of the display tube.

In yet another embodiment, a heat shield is provided around the whole display screen. The heat shield engages the edge of the display screen. As a result of the heat shield no heated air flows across the display screen and the display screen is warmed up less rapidly than the cone.

In still another embodiment, the cone is heated to a higher temperature than the display screen by means of extra heating elements.

BRIEF DESCRIPTION OF THE DRAWING

The invention will now be described in greater detail, by way of example, with reference to the accompanying drawing, in which.

DESCRIPTION OF THE PREFERRED EMBODIMENTS

Figure 1:
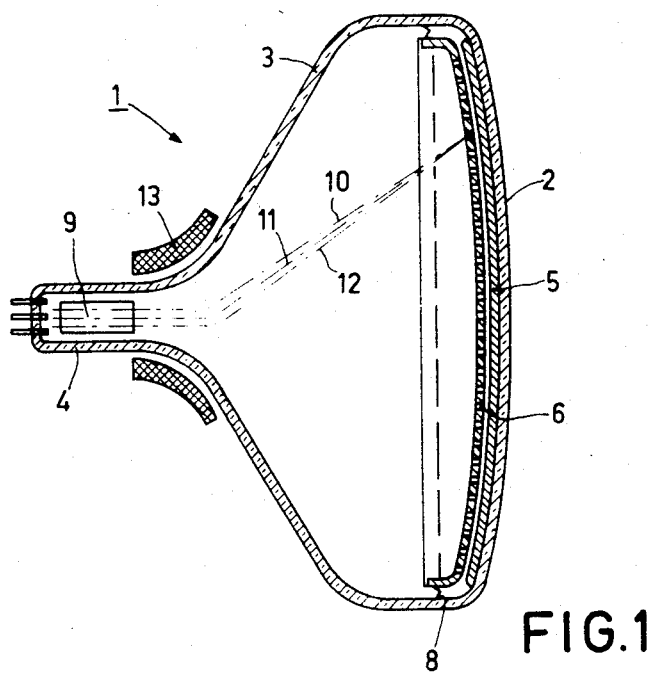
FIG. 1 is a diagrammatic sectional view of a colour display tube.

The display tube shown in FIG. 1, in this case a colour display tube, is formed by a glass envelope 1 which has a substantially rectangular display screen 2, a cone 3 and a neck 4. A pattern of phosphors 5 luminescing in the colours red, green and blue is provided on the display screen 2. At a short distance from the display screen 2 a colour selection electrode 6 having a large number of apertures is suspended by means of diagrammatically shown suspension means 8 connected in the corners of the upright edge. A system 9 of electron guns is mounted in the ncek 4 of the tube to generate three electron beams 10, 11 and 12. These beams are deflected, by means of a system 13 of deflection coils placed around the tube, and intersect each other at the colour selection electrode 6, after which each of the electron beams impinges upon one of the three phosphors provided on the display screen 2.

Figure 2:
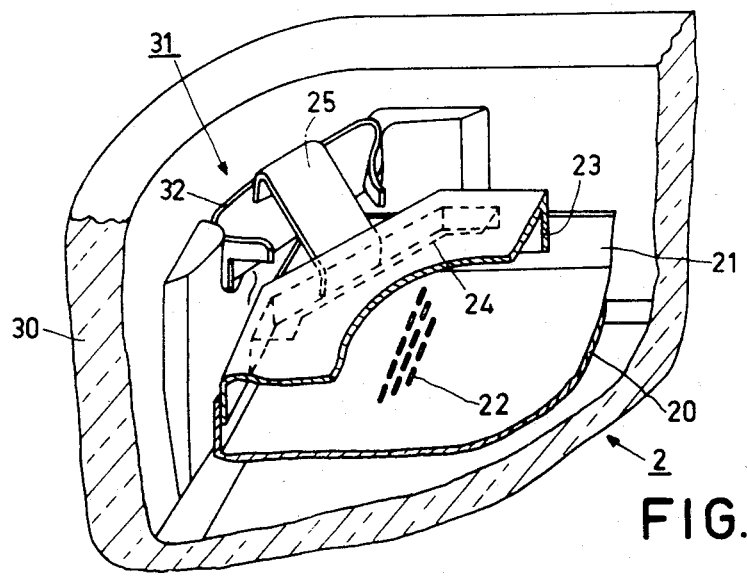
FIG. 2 is a perspective view of a corner of the display screen of the tube shown in FIG. 1, FIGS. 3a to 3c explain a first embodiment of a method in accordance with the invention for joining the display screen to the cone, FIG. 4 explains the first embodiment of a method in accordance with the invention for evacuating the display tube, FIG. 5 explains a second embodiment of a method in accordance with the invention, FIG. 6 explains a fourth embodiment of a method in accordance with the invention, and FIG. 7 explains a fifth embodiment of a method in accordance with the invention.

FIG. 2 shows for explanation a perspective view of the suspension of the colour selection electrode in a corner of the display screen. This suspension is known per se from U.S. Pat. No. 3,548,235. The colour selection electrode is formed by a mask sheat 20 having a large number of apertures 22 and an upright edge 21. A diaphragm 23 is connected to the upright edge 21. A flat resilient element 25 which extends substantially perpendicularly to the electron beams deflected towards the corner of the display window is connected to a supporting strip 24 connected in the corner of the diaphragm 23. A chamber-like recess 31 in which a clamping spring 32 is provided is located in the corner of the upright edge 30 of the display screen 2. The flat resilient element 25 is connected to the clamping spring 32.

It is to be noted that the invention is suitable not only for the above-described type of colour display tubes but may also be used in other types of colour display tubes and in black-and-white display tubes.

Figure 3A:
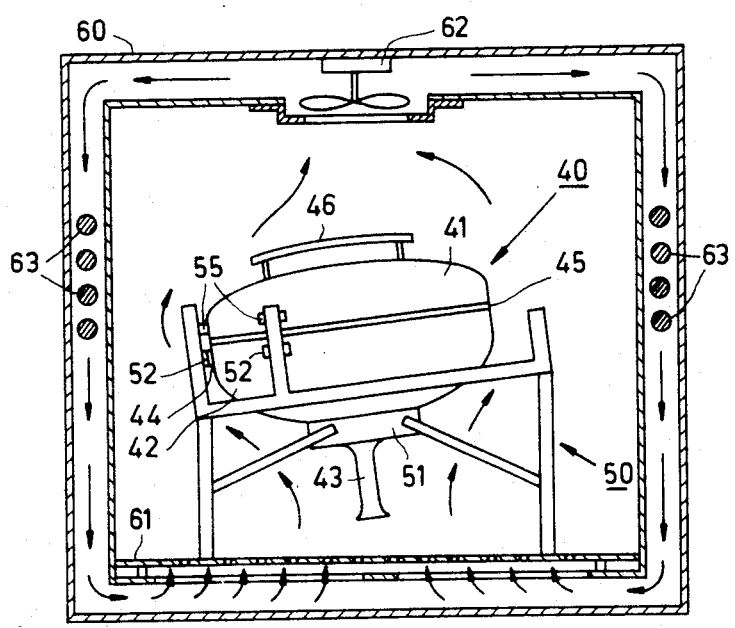
Figure 3B:
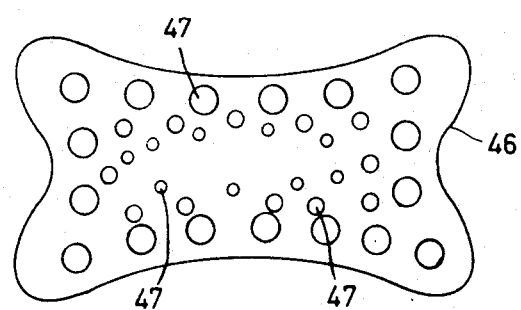
Figure 3C:
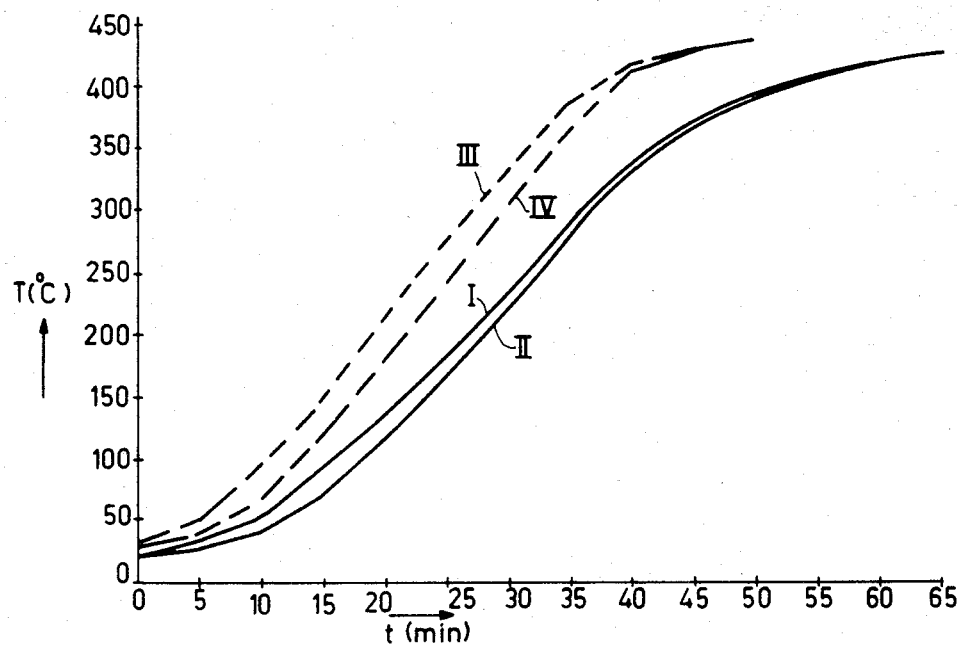

A first embodiment of a method in accordance with the invention will be described with reference to FIGS. 3a to 3c. FIG. 3a shows diagrammatically and partly as a sectional view a compartment of a furnace 60 in which the display tube 40 is placed in a jig 50. The display tube 40 is composed of a display screen 41, a cone 42 and a neck 43. Neck 43 and cone 42 were sealed together already in an earlier stage. The cone 42 has along its circumference three reference studs 44 one of which is visible in FIG. 3a. A glass frit 45 is provided on the edge of the cone 42 for joining the display screen 41 to the cone 42. The cone 42 is placed in the jig 50 in which the cone 42 engages the ring 51 near the neck 43. With the three reference studs 44 the cone 42 engages three abutments 52 of the jig 50, two of which are visible in FIG. 3a. The display screen 41 is placed on the edge of the cone 42, the display screen 41 also engaging three abutments 55 on the jig 50 only two of which are visible in FIG. 3a. In order to ensure that the display screen 41 and the cone 42 rest against the abutments, the jig has been constructed so as to be tilted slightly in two directions. Before insertion into the furnace 60, a heat shield 46 is placed at a short distance from the central part of the display screen 41. FIG. 3b is a plan view of the heat shield 46. The heat shield 46 has a large number of apertures 47. The size of the apertures 47 increases proceeding from the centre towards the edge of the heat shield. Because of the pattern of apertures 47, the shielding affect decreases gradually from the centre towards the edge.

The jig 50 with the display tube 40 placed therein is positioned on an apertured transport belt 61 which carries the display tube 40 through the furnace. The furnace is divided into a number of compartments. In each compartment air is drawn-in by a fan 62 and is forced by heating elements 63. This heated air is directed toward the tube's lower side via the apertures in the transport belt 61. In the furnace the display tube 40 is heated to approximately 425° C. At approximately 400° C. the glass frit 45 recrystallizes so that the display screen 41 and the cone 42 are rigidly connected together in a vacuum-tight manner.

Because the heat shield 46, less air turbulence occurs near the central part of the display screen 41 and this part is warmed up less rapidly. FIG. 3c shows the variation of the temperature T(°C.) of the outside and inside of the display screen 41 during passage through the furnace as a function of time t(min.), with and without the use of a heat shield 46. The lines I and II denote the temperatures of the outside and the inside, respectively, of the display screen 41 while using the heat shield 46; and the broken lines III and IV denote the temperatures of the outside and the inside, respectively, of the display screen 41 without the use of the heat shield 46. As shown in FIG. 3c a smaller temperature difference occurs between the outside and the inside of the display screen 41 when the heat shield 46 is used. The maximum temperature difference without the use of the heat shield is approximately 35° C., while the maximum temperature difference with the use of the heat shield is approximately 25° C. As a result of the smaller temperature difference the extent of doming of the display screen 41 is smaller so that the tensile stress in the corners of the display screen 41 and hence also the probability of fracture of the display tube 40 are considerably reduced.

Figure 4:
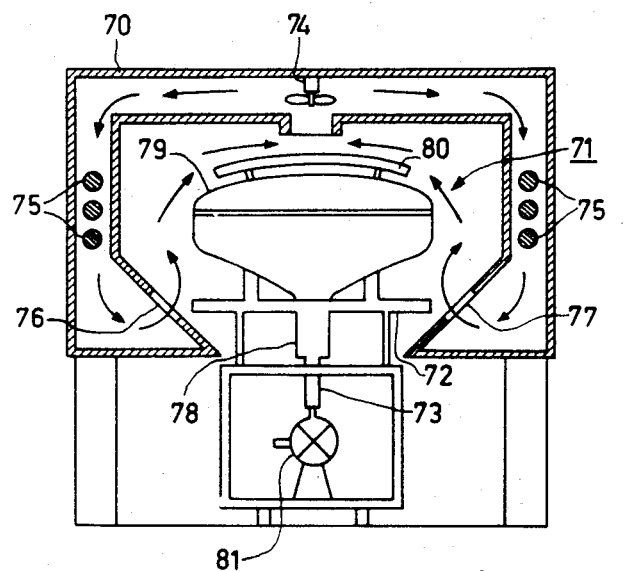

Such a heat shield is also effective during evacuation of the display tube. After affixing the display screen to the cone the electron gun system is sealed in the neck of the display tube, after which the display tube is evacuated. FIG. 4 is a diagrammatic partial sectional view of a compartment 70 in the furnace for evacuating the display tube 71. The display tube 71 is placed in a holder 72 and a pump 81 is connected to the exhaust tube 73 of the tube 71. In the furnace the display tube 71 is heated to approximately 360° C. to liberate the residual gases and obtain a good vacuum in the tube 71. The tube 71 is heated in the furnace by means of heated air which is drawn-in by a fan 74 provided on the upper side of the compartment 70, and forced by heating elements 75 and around the tube 71 from the neck end via inflow apertures 76 and 77. Prior to being introduced into the furnace, a heat shield 80 having the same shape as the heat shield shown in FIG. 3b is placed at a short distance above the central part of the display screen 79. Because of the heat shield 80, less air turbulence occurs near the display screen 79 and the display screen 79 is heated less rapidly than the remaining parts of the display tube 71. The maximum temperature difference between the outside and the inside of the display screen 79 with the use of the heat shield 80 is approximately 30° C., while the maximum temperature difference is approximately 40° C. without the use of the heat shield. It is to be noted that the maximum temperature differences when evacuating the display tube are larger than when affixing the display screen to the cone. This is caused by the more rapid warm up of the display tube during evacuation. Because of the heat shield 80, a smaller temperature difference occurs between the outside and the inside of the display screen 79. As a result of this less doming of the display screen 79 occurs and the tensile stress in the corners of the display screen 79, which is the resultant of the tensile stress caused by the doming and the compressive stress caused by the pressure difference and directed opposite to the tensile stress, is considerably reduced.

Instead of a heat shield which is provided at some distance above the central part of the display screen, a heat shield made of a poor heat conducting material may be provided on the display screen during screen affixment and evacuation. Because of this the display screen is also warmed up more slowly so that the tensile stresses are reduced.

Figure 5:
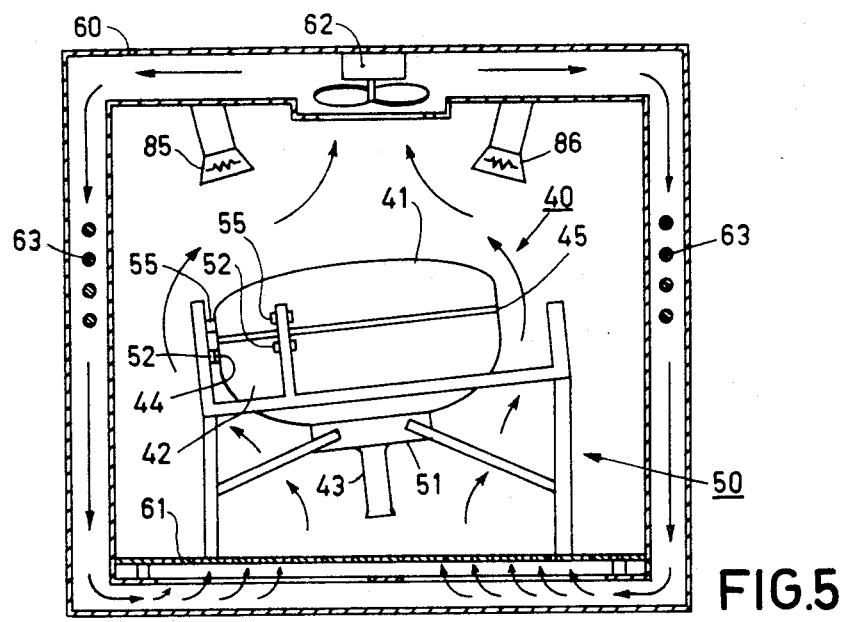

A second embodiment will be described in greater detail with reference to FIG. 5. The figure shows a compartment of the furnace for affixing the display screen to the cone. Similar components are referred to by the same reference numerals as in FIG. 3a. Above the display screen 41 two infra-red lamps 85 and 86 are positioned for irradiating the display screen 41 during warm up. Because of the added infra-red radiation, a smaller temperature difference will occur between the outside and the inside of the display screen 41. As a result of this, less doming of the display screen 41 will occur. The tensile stresses in the corners of the display screen 41 are thus reduced and the possibility of fracture of the display tube is also reduced. Supplemental heating of the display screen by means of thermal radiation may also be used during evacuation of the display tube.

According to a third embodiment (not shown) at least the display screen is preheated prior to being introduced into the furnace for affixing the display screen to the cone and for evacuating the display tube. After preheating, the outside of the display screen will cool faster than the inside of the display screen so that upon insertion into the furnace for affixing the display screen to the cone and for evacuating the display tube, the inside of the display screen will have a higher temperature than the outside of the display screen. In the furnace the display screen is heated from the outside. The resulting temperature difference between the outside and the inside of the display screen is thus reduced. As a result of this less, doming of the display screen occurs and the tensile stresses in the corners of the display screen are reduced. Preheating of the display screen before affixment may be done by means of, for example, a number of infra-red lamps. Preheating before evacuating the display tube may advantageously be obtained by sealing the electron gun system in the still warm display tube immediately after affixing the display screen to the cone and then evacuating the still warm display tube.

Figure 6:
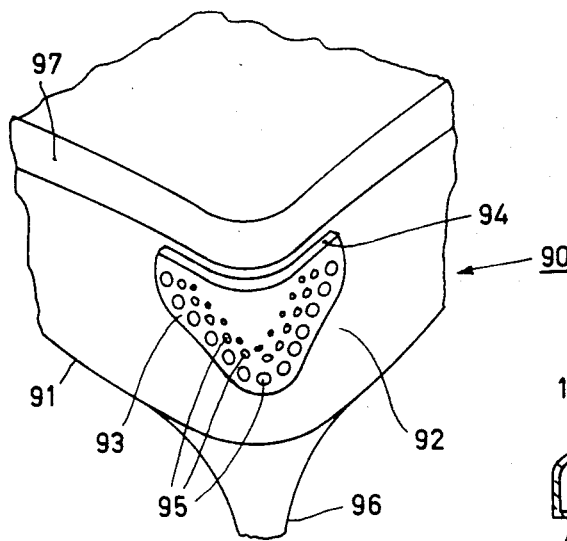

A fourth embodiment will be described in detail with reference to FIG. 6, which is en elevation of a corner of a display tube. In this embodiment, when evacuating the display tube 90, heat shields 93 are provided at a very short distance from the corners 92 of the cone 91, the edges 94 of which engage the cone 91. Each heat shield 93 has a pattern of apertures 95 having a heat transmission capability which increases from the edge of the cone 91 towards the neck 96. The heat shields 93 shield the corners 92 of the cone 91 from the heated air which is conveyed past the display tube from the neck 96. As a result of the pattern of apertures 95, the shielding effect decreases gradually so that a uniform temperature distribution in the corner 92 of the cone 91 occurs. As a result of the heat shields 93, the heating of the corners 92 of the cone 91 during evacuation of the display tube occurs more slowly than in the corners of the display screen 97. The corners 92 of the cone 91 thus exert compressive forces on the corners of the display screen 97, which compressive forces are directed opposite to the tensile stresses occurring in the corners of the display screen as a result of the doming of the display screen 97. The resulting tensile stresses in the corners of the display screen are thus strongly reduced and the probability of fracture is also considerably reduced.

The occurrence of tensile stresses in the display screen may also be reduced during evacuation by heating the upright edge of the display screen to a higher temperature than the remaining parts of the display tube, by means of a number of heating elements. These heating elements may be provided, for example, in a partition which is placed transversely to the walls of the furnace for evacuation, as shown in FIG. 4. As a result of the higher temperature the upright edge expands more than the central part of the display screen. The doming of the display screen is thus counteracted so that the tensile stresses in the corners of the display screen are reduced.

Figure 7:
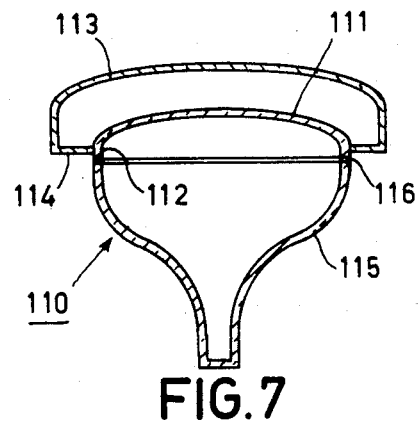

A fifth embodiment will be described in detail with reference to FIG. 7 which is a diagrammatic sectional view of a display tube 110. A heat shield 113 is provided over the whole display screen 111 and has its edge 114 engaging the upright edge 112 of the display screen 111. With the heat shield 112 attached, the display tube 110 is passed through an affixing furnace as shown in FIG. 3a. Because of the heat shield 112, the cone 115 is warmed up more rapidly than the display screen 111 so that the cone 115 will expand more than the display screen 111. In this condition the glass frit 116 recrystallizes at approximately 400° C. so that the display screen 111 and the cone 115 are secured together in this position. After cooling and shrinkage of the display tube 110, the corners of the cone 115 exert compressive stresses on the corners of the display screen 111. The compressive stresses compensate, for the greater part, for the tensile stresses occurring upon evacuation of the display tube 110. The possibility of fracture when evacuating the display tube is thus considerably reduced.

According to another embodiment, obtaining expansion of the cone which is greater than that of the display screen is achieved during affixment of the display screen to the cone, by heating the corners of the cone to a higher temperature than the display screen, for example, by means of a number of infrared lamps. The compression stresses occurring after cooling the tube then compensate again for the tensile stresses occurring upon evacuating the display tube.

Another method for reducing the possibility of fracture of the display tube during screen affixment and evacuation of the display tube, is to make a a suitable choice of the thickness of the display screen. The temperature difference between the outside and the inside of the display screen is proportional to the square of the thickness of the display screen. By reducing the thickness of the display screen and increasing the thickness of the upright edge, the upright edge of the display screen will be drawn inward to a smaller extent, during warm up, thus leading to a reduction of the stresses in the display screen.

What is claimed is:

1. A method of manufacturing a display tube, comprising a funnel with a rectangular edge and a display screen having a rectangular upstanding edge, wherein heat is applied to the tube by means of a heated gas flowing across the tube's outer surface, the improvement comprising restricting said flow at a selected area of said outer surface by providing a heat shield including a pattern of apertures in the proximity of said area to minimize differences in thermal expansion between the tube's outer and inner surfaces.

2. A method as in claim 1 where said heat shield is positioned to restrict the flow of heated gas near the central outer surface of the display screen.

3. A method as in claim 2 where the pattern of apertures in the heat shield is configured to effect a rate of heating of the shielded area which increases with distance from the shield's center.

4. A method as in claim 1 where said heat shield is positioned to restrict the flow of heated gas near a corner of the rectangular edge of the funnel.

5. A method as in claim 4 where the pattern of apertures in the heat shield is configured to effect a rate of heating of the shielded area which increases with distance from the edge of the funnel.

6. A method as in claim 5 where the heat shield includes a transversely extending flange in contact with the outer surface of the funnel near the rectangular edge of the funnel.

7. A method as in claim 1 where said heat shield extends across substantially the entire outer surface of the display screen.

8. A method as in claim 7 where said heat shield engages the upstanding edge of the display screen.

* * * * *